US012613689B2

(12) United States Patent
Wakiguchi et al.

(10) Patent No.: US 12,613,689 B2
(45) Date of Patent: Apr. 28, 2026

(54) ELECTRONIC CONTROL DEVICE, REPROGRAM EXECUTION METHOD, AND NON-TRANSITORY COMPUTER READABLE STORAGE MEDIUM

(71) Applicants: DENSO CORPORATION, Kariya-city (JP); TOYOTA JIDOSHA KABUSHIKI KAISHA, Toyota (JP)

(72) Inventors: Kotaro Wakiguchi, Kariya-city (JP); Yuto Hirashima, Kariya-city (JP); Yuma Okito, Nagoya (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/304,390

(22) Filed: Apr. 21, 2023

(65) Prior Publication Data

US 2023/0350667 A1 Nov. 2, 2023

(30) Foreign Application Priority Data

Apr. 27, 2022 (JP) ................................ 2022-073343

(51) Int. Cl.
*G06F 8/65* (2018.01)

(52) U.S. Cl.
CPC ...................................... *G06F 8/65* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 12,020,018 B2* | 6/2024 | Lee ........................ | B62D 5/046 |
| 2014/0082599 A1* | 3/2014 | Kim .......................... | G06F 8/65 |
| | | | 717/168 |

(Continued)

FOREIGN PATENT DOCUMENTS

JP 2021-009658 A 1/2021

OTHER PUBLICATIONS

Stepanović, Mia, et al. "Application lifecycle management in automotive: Adaptive AUTOSAR example." 2018 IEEE 8th International Conference on Consumer Electronics-Berlin (ICCE-Berlin). IEEE, 2018. (Year: 2018).*

(Continued)

*Primary Examiner* — Thuy Dao
*Assistant Examiner* — Joanne G Macasiano
(74) *Attorney, Agent, or Firm* — Harness, Dickey & Pierce, P.L.C.

(57) ABSTRACT

An electronic control device includes: a manifest file acquisition unit; an update program acquisition unit; and a reprogram execution unit that executes reprogramming according to a machine state and a function group defined in a manifest file by instructing an electronic control unit as a reprogram target device to write the update program. The manifest file defines a normal state and a reprogram state as machine states conforming to a predetermined in-vehicle software platform standard specification; a first group to which a reprogrammable application while a vehicle drive mechanism is running belongs as a function group conforming to the specification; a second group to which an application not relating to the reprogramming belongs; and an activation state and a stop state in each of the first group and the second group.

9 Claims, 17 Drawing Sheets

(56) References Cited

U.S. PATENT DOCUMENTS

| | | | |
|---|---|---|---|
| 2017/0255461 A1* | 9/2017 | Shimotani | G06F 8/65 |
| 2018/0150290 A1* | 5/2018 | Matsuda | G06F 11/1433 |
| 2020/0174779 A1* | 6/2020 | David | G06F 8/654 |
| 2020/0249937 A1* | 8/2020 | Teraoka | G06F 8/658 |
| 2021/0149659 A1* | 5/2021 | Abe | G06F 8/65 |
| 2021/0157573 A1 | 5/2021 | Abe et al. | |
| 2021/0192867 A1* | 6/2021 | Fang | G07C 5/0816 |
| 2022/0185301 A1* | 6/2022 | Moon | G06F 11/3013 |
| 2023/0107998 A1* | 4/2023 | Lee | G06F 8/65 717/168 |
| 2023/0176850 A1* | 6/2023 | Oh | H04L 67/34 717/171 |
| 2023/0236822 A1* | 7/2023 | Liu | H04W 8/245 |

OTHER PUBLICATIONS

Rumez, Marcel, et al. "An overview of automotive service-oriented architectures and implications for security countermeasures." IEEE access 8 (2020): 221852-221870. (Year: 2020).*

Fürst, Simon, and Markus Bechter. "AUTOSAR for connected and autonomous vehicles: The AUTOSAR adaptive platform." 2016 46th annual IEEE/IFIP international conference on Dependable Systems and Networks Workshop (DSN-W). IEEE, 2016. (Year: 2016).*

Prasad, Adithi, and P. Shanthi. "Automotive electronic control unit reprogramming using delta method—a review." 2021 Asian Conference on Innovation in Technology (Asiancon). IEEE (Year: 2021).* https://monoist.itmedia.co.jp/mn/articles/1903/04/news012_3.html "Architecture of AUTOSAR Adaptive Platform," posted on Mar. 4, 2019.

"Specification of Execution Management," AUTOSAR, Doc. ID No. 721, Release R20-11, pp. 1-149.

"System Tests of Adaptive Platform," AUTOSAR, Doc. ID No. 890, Release R19-11, pp. 1-144.

* cited by examiner

| USE CASE | CONT | UPDATE TAR | MACHINE STA | FUNC GR |
|---|---|---|---|---|
| 1 | EXE W-LESS RE-PRO DUR ACT OF VEH DRI MECH, AND EXE INST, UPDATE AND UNINST OF APP | ACT SCR (W/O SW SCR) | NOR STA | (BEF START RE-PRO) INST STA TRANS TO STOP STA FOR 1ST GR<br>(AFT COMP RE-PRO) INST STA TRANS TO ACT STA FOR 1ST GR |
| 2 | EXE W-LESS RE-PRO DUR ACT OF VEH DRI MECH, AND UPDATE FIRM | NON-ACT SCR (W/ SW SCR WHEN SW FROM ACT TO STOP OR STOP TO ACT OF VEH DRI MECH NEXT TIME) | NOR STA | |
| 3 | EXE W-LESS RE-PRO DUR STOP OF VEH DRI MECH, AND UPDATE FIRM | NON-ACT SCR (W/ SW SCR BY RESET) | (BEF START RE-PRO) INST STA TRANS TO RE-PRO STA<br>(AFT COMP RE-PRO) INST STA TRANS TO RE-START STA | (BEF START RE-PRO) INST STA TRANS TO STOP STA FOR 2ND GR |
| 4 | EXE WIRED RE-PRO DUR STOP OF VEH DRI MECH, AND UPDATE FIRM | NON-ACT SCR (W/ SW SCR BY RESET) | (BEF START RE-PRO) INST STA TRANS TO RE-PRO STA<br>(AFT COMP RE-PRO) INST STA TRANS TO RE-START STA | (BEF START RE-PRO) INST STA TRANS TO STOP STA FOR 2ND GR |

W-LESS RE-PRO EXE PROC

START

ACQ MANI FILE — S1

ACQ UPDATE PRO — S2

S3 — FUNC OTHER THAN RE-PRO FUNC STOPPABLE? — YES → 3

NO

S4 — STA TRANS OF FUNC GR NECESSARY? — YES → 1

NO

START RE-PRO — S11

S12 — RE-PRO COMP? — NO → S13 RE-PRO CANCELLED? — NO

YES

S13 RE-PRO CANCELLED? — YES → S14 ROLLBACK 2    4

END

FIG. 7 WIRED RE-PRO EXE PROC

ELECTRONIC CONTROL DEVICE, REPROGRAM EXECUTION METHOD, AND NON-TRANSITORY COMPUTER READABLE STORAGE MEDIUM

CROSS REFERENCE TO RELATED APPLICATIONS

The present application claims the benefit of priority from Japanese Patent Application No. 2022-073343 filed on Apr. 27, 2022. The entire disclosure of the above application is incorporated herein by reference.

TECHNICAL FIELD

The present disclosure relates to an electronic control device, a reprogram execution method, and a non-transitory computer readable storage medium.

BACKGROUND

For example, in an in-vehicle electronic control unit (hereinafter referred to as an ECU (Electronic Control Unit)), it is possible to reprogram an update program for the purpose of improving functions, repairing bugs, and the like. In this case, the master ECU, which functions as an update master that manages the implementation of reprogramming, performs reprogramming by instructing the reprogramming target ECU, which functions as a reprogramming target, to write an update program.

SUMMARY

According to an example, an electronic control device may include: a manifest file acquisition unit; an update program acquisition unit; and a reprogram execution unit that executes reprogramming according to a machine state and a function group defined in a manifest file by instructing an electronic control unit as a reprogram target device to write the update program. The manifest file defines a normal state and a reprogram state as machine states conforming to a predetermined in-vehicle software platform standard specification; a first group to which a reprogrammable application while a vehicle drive mechanism is running belongs as a function group conforming to the specification; a second group to which an application not relating to the reprogramming belongs; and an activation state and a stop state in each of the first group and the second group.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing a state transition of a machine state;

FIG. 3 is a diagram showing a content of a use case;

DETAILED DESCRIPTION

Figure 1:
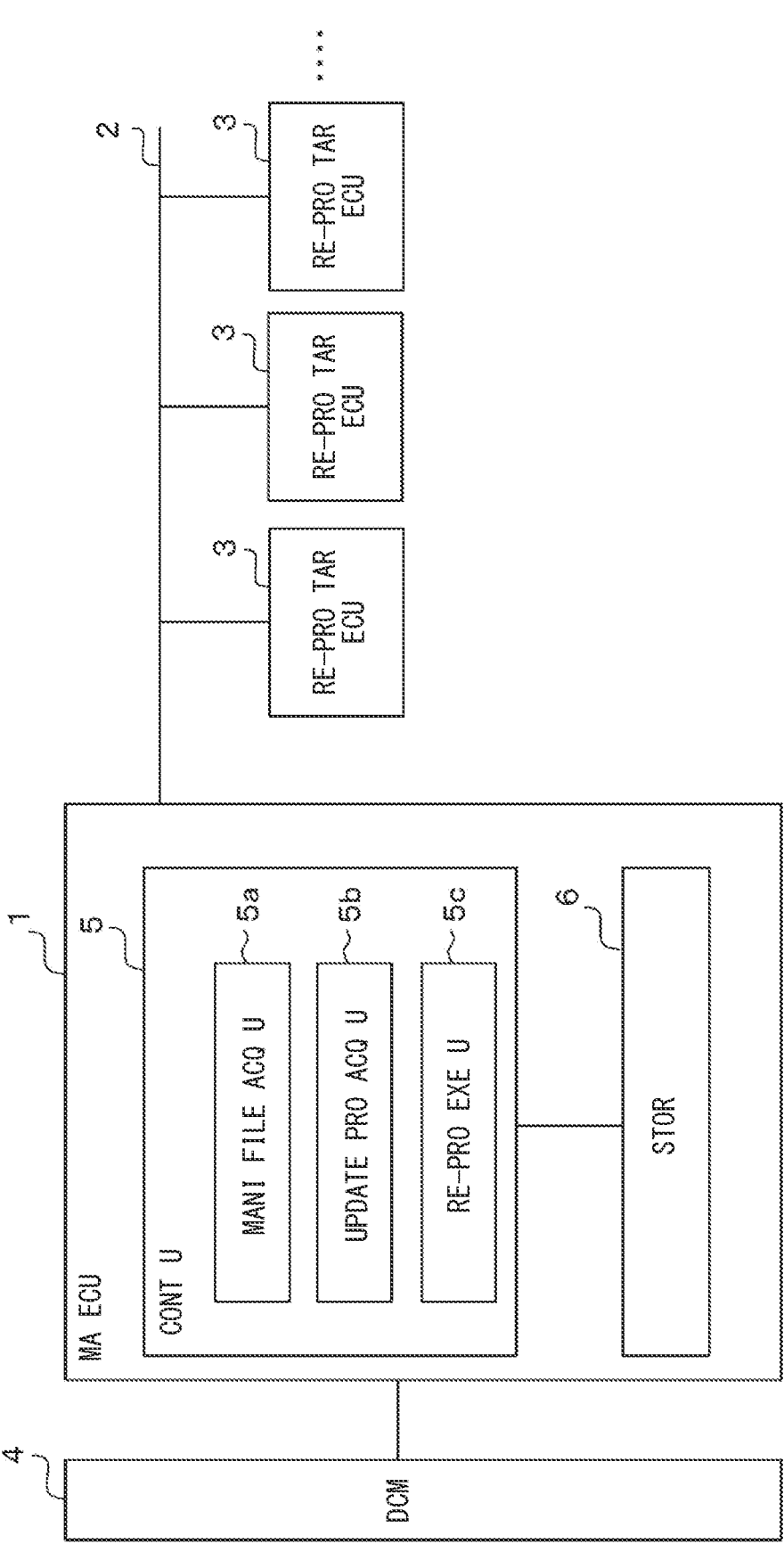
FIG. 1 is a functional block diagram showing an embodiment.

At the start of reprogramming, it is necessary to restart the reprogram target ECU and activate the reprogram target ECU in the state of the machine dedicated to the reprogramming. The restart is also referred to as a re-activation. Also, even when the reprogramming process is finished, it is necessary to restart the reprogram target ECU and activate the reprogram target ECU in a normal state. However, in the scheme of restarting the reprogram target ECU at the start and at the end of the reprogramming process, in the wireless reprogramming process in which the user performs the reprogramming process by wireless communication, the time when the reprogram target ECU restarts becomes the waiting time for providing service. In addition, in the reprogramming process performed by a dealer's operator through wired communication, the time required for restarting the reprogram target ECU is the waiting time for the operation.

The present embodiments have been made in view of the circumstances described above, and an object of the present embodiments is to provide an electronic control device, a reprogram execution method, and a reprogram execution program, which provide to appropriately perform reprogramming without restarting the electronic control device as the reprogram target device.

According to the first aspect of the embodiments, the manifest file acquisition unit acquires the manifest file. An update program acquisition unit acquires an update program. A reprogram execution unit executes reprogramming by instructing an electronic control unit as a reprogram target device to write an update program. In the manifest file, at least a normal state and a reprogram state in which only applications relating to the reprogramming are activated are defined as machine states conforming to the standards of the predetermined in-vehicle software platform standard specifications; a first group to which applications that can be reprogrammed while the vehicle drive mechanism is running is defined as a function group conforming to the standards of the predetermined in-vehicle software platform standard specifications; a second group to which applications that are not relating to the reprogramming belong is defined; and an activation state and a stop state are defined in each of the first group and the second group. The reprogram execution unit executes the reprogramming according to the machine state and the function groups defined in the manifest file.

The state transition to the normal state or the reprogram state defined as the machine state in the manifest file is instructed, and the state transition to the activation state or stop state is instructed individually to each of the first group and the second group defined as the function groups in the manifest file. By instructing the state transition to the normal state or the reprogram state and instructing the state transition to the activation state or the stopped state for each of the first group and the second group, the reprogramming can be performed appropriately. As a result, the reprogramming can be performed appropriately without restarting the electronic control unit as the reprogram target device.

Hereinafter, one embodiment will be described with reference to the drawings. As shown in FIG. 1, the master ECU 1 mounted in the vehicle functions as an update master that manages the execution of reprogramming for the purpose of improving functions, repairing defects, and the like. The master ECU 1 is connected to a plurality of ECUs via an in-vehicle network 2 so as to enable data communication, and the master ECU 1 integrally manages the plurality of ECUs by instructing an operation command to the plurality of ECUs, acquiring an operation state of the plurality of ECUs and the like. The in-vehicle network 2 is, for example, CAN (Controller Area Network, registered trademark), Ethernet (registered trademark), LIN, CXPI (Clock Extension Peripheral Interface, registered trademark), FLEXRAY (registered trademark), MOST (Media Oriented Systems Transport, registered trademark), or the like.

The master ECU 1 identifies a reprogramming target ECU 3 that functions as a reprogramming target from among the plurality of ECUs, and executes reprogramming by instructing the reprogramming target ECU 3 to write an update program therein. The master ECU 1 is connected to a DCM (Data Communication Module) 4 functioning as a data communication device. The DCM 4 is wirelessly connected to an OTA center via a communication network so that a distribution package transmitted from the OTA center can be received. When receiving the distribution package transmitted from the OTA center, the DCM 4 transmits the received distribution package to the master ECU 1. When the delivery package is transferred from the DCM 4, the master ECU 1 extracts the update program from the transferred delivery package and instructs the reprogram target ECU 3 to write the extracted update program, thereby executing the reprogramming.

Also, the master ECU 1 can transfer a distribution package from a reprogramming tool (not shown) by wire connection with the reprogramming tool. When the delivery package is transferred from the reprogramming tool, the master ECU 1 extracts the update program from the transferred delivery package and instructs the reprogram target ECU 3 to write the extracted update program, thereby executing the reprogramming.

The master ECU 1 includes a control unit 5 and a storage 6. The control unit 5 is provided by a microcomputer having a CPU (Central Process Unit), a ROM (Read Only Memory), a RAM (Random Access Memory), and an I-O (Input-Output). By executing a control program stored in a non-transitory tangible storage medium, the control unit 5 executes a process corresponding to the control program, and controls the overall operation of the master ECU 1. The control program executed by the control unit 5 includes a reprogram execution program.

The storage 6 is a nonvolatile memory mainly including, for example, a NOR flash memory or a NAND flash memory, and is shared by multiple applications executed by the control unit 5. That is, a plurality of applications each access the storage 6 to write and read data. Although the configuration in which the storage 6 is built in the master ECU 1 is exemplified in this embodiment, it may be also possible to apply a configuration in which the storage 6 is arranged outside the master ECU 1. Further, although the configuration in which the storage 6 is shared by a plurality of applications executed by the control unit 5 is illustrated, the application executed by the control unit of another ECU connected to the master ECU 1 for data communication may share the storage 6.

The control unit 5 includes a manifest file acquisition unit 5a, an update program acquisition unit 5b, and a reprogram execution unit 5c. These units 5a to 5c provide the reprogram execution program described above. When performing wireless reprogramming, the manifest file acquisition unit 5a acquires a manifest file by receiving the manifest file transmitted from the OTA center by the DCM 4 and transferring the received manifest file from the DCM 4. When performing wired reprogramming, the manifest file acquisition unit 5a acquires a manifest file by transferring the manifest file from the reprogramming tool. The manifest file is a data group storing various information necessary for the master ECU 1 to perform the reprogramming, and is sometimes referred to as specification data.

In AUTOSAR's adaptive platform (hereinafter referred to as AP (Adaptive Platform)), EM (Execution Management) controls the activation and termination of applications and services based on SM (State Management) instructions. According to AP specifications, three machine states, "startup state", "shutdown state", and "restart state", are necessary. New machine states can be defined by adding state definitions to the manifest file. A function group is a group of user-level application processes functionally consistent with each other, and a group including a new state or a arbitrary application can be defined by adding to the manifest file. By adding to the manifest file, it is also possible to manage how the machine state and the function group are transitioned and which applications are started or stopped in the reprogramming process.

Figure 2:
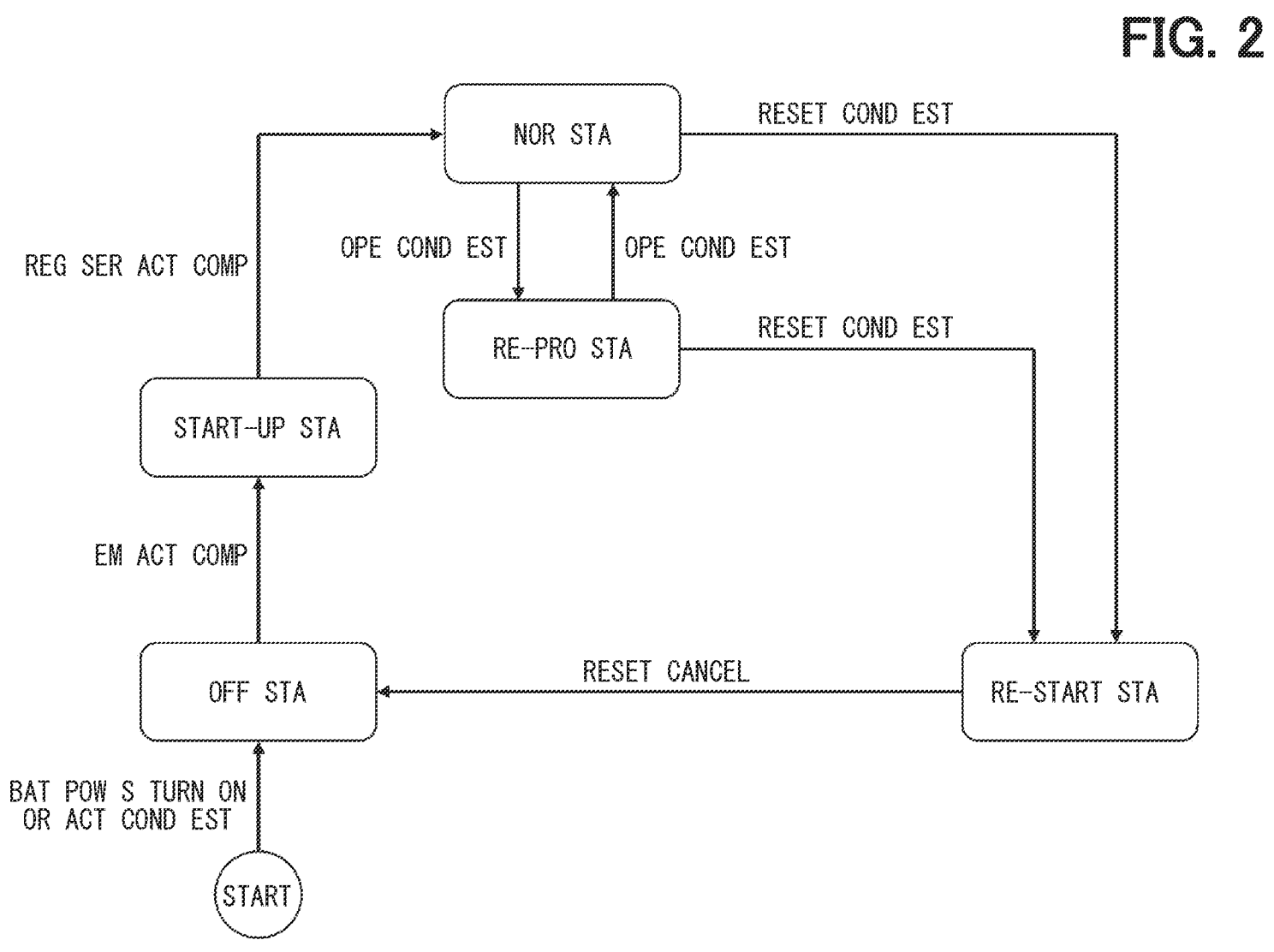

In this embodiment, in addition to the above-described "startup state", "shutdown state", and "restart state", a "reprogram state" and a "normal state" are defined as the machine state, in which only applications relating to the reprogram are activated, and the state transitions are performed as shown in FIG. 2. In the "reprogram state", only the application necessary for reprogramming is running, and the application related to the vehicle driving and the navigation is not running. When EM activation is completed from an "off" state, the state transitions to the "startup state". When the activation of the registration service is completed from the "startup state", the state transitions to the "normal state". When the operating condition is satisfied from the "normal state", the state transitions to the "reprogram state". When the operating condition is satisfied from the "reprogram state", the state transitions to the "normal state". When the reset condition is satisfied from the "normal state" or the "reprogram state", the state transitions to the "restart state". When the reset is cancelled from the "restart state", the state transitions to the "off" state.

In this embodiment, as function groups, a "first group" to which applications that can be reprogrammed while the vehicle drive mechanism is activated belong, and a "second group" to which applications that are not involved in the reprogramming belong are defined. An activation state and a stop state are defined in each of the first group and the second group, respectively. When the vehicle drive mechanism is running, it means that the ignition is turned on in the case of an engine-driven vehicle, and that the motor is turned on in the case of a motor-driven vehicle. "While the vehicle drive mechanism is stopped" means that the ignition is turned off in the case of an engine-driven vehicle, and that the motor is turned off in the case of a motor-driven vehicle. Alternatively, the vehicle drive mechanism being activated indicates, for example, that the vehicle is running. Applications included in the first group are applications that do not affect vehicle running, such as music and video playback applications. The state that the vehicle drive mechanism is stopped indicates, for example, that the vehicle is stopped temporarily. Applications included in the second group are applications that are not required for executing the repro-gram, such as applications related to vehicle travel, music and video playback applications, and the like.

The update program acquisition unit 5b acquires the update program by extracting the update program from the distribution package transferred from the DCM 4 when the wireless reprogramming is performed. When performing the wired reprogramming, the update program acquisition unit 5b acquires the update program by extracting the update program from the distribution package transferred from the reprogramming tool. When the update program is acquired by the update program acquisition unit 5b, the reprogram execution unit 5c performs the reprogramming by instructing the reprogramming target ECU 3 to write the acquired update program.

Use cases 1 to 4 are exemplified as a use case that the reprogram execution unit 5c performs the reprogramming as shown in FIG. 3. Use case 1 is a case where the wireless reprogramming is performed while the vehicle drive mechanism is running, and applications are installed, updated, and uninstalled. In the use case 1, the update target is the activation screen, and the state transition of the function group is required without switching between the activation screen and the non-activation screen. In the use case 1, an application belonging to the first group is instructed to perform a state transition to the stop state, and the reprogramming is started, and after the reprogramming is completed, an application belonging to the first group is instructed to perform a state transition to the activation state. For example, a situation is exemplified in which an application not relating to the vehicle travelling is reprogrammed while the vehicle is running. In this case, the application as the reprogram target is updated by transitioning to the stop state due to the state transition, and transitions to the activation state when the reprogramming is completed.

Use case 2 is a case where the wireless reprogramming is performed while the vehicle drive mechanism is activated, and firmware is updated. In the use case 2, the update target is the non-activation screen, and the activation screen and the non-activation screen are switched when the vehicle drive mechanism is switched from the activation state to the stop state or from the stop state to the activation state in the next time, and the state transition of the function group is unnecessary. In the use case 2, the reprogramming is started without instructing the state transition to the application belonging to the first group. For example, a situation is exemplified in which an application on a non-activation screen is reprogrammed while the vehicle is running. In this case, since the reprogram target is the non-activation screen application, no state transition is necessary.

Use case 3 is a case where the wireless reprogramming is performed while the vehicle drive mechanism is stopped, and firmware is updated. In the use case 3, the update target is the non-activation screen, and it is necessary to restart to switch between the activation screen and the non-activation screen, and transition the state of the function group. In the use case 3, a state transition to the reprogram state is instructed, an application belonging to the second group is instructed to perform a state transition to the stop state, the reprogram is started, and after the reprogramming is completed, a state transition to the restart state is instructed. For example, a situation is exemplified in which an application on a non-activation screen is reprogrammed while the vehicle is stopped. In the reprogram state, applications other than those required for reprogramming are stopped.

Use case 4 is a case where the wired reprogramming is performed while the vehicle drive mechanism is stopped, and firmware is updated. In the use case 4, the update target is the non-activation screen, and it is necessary to restart to switch between the activation screen and the non-activation screen, and transition the state of the function group. In the use case 4, a state transition to the reprogram state is instructed, an application belonging to the second group is instructed to perform a state transition to the stop state, the reprogram is started, and after the reprogramming is completed, a state transition to the restart state is instructed.

The following will describe an operation of the above configuration with reference to FIG. 4 to FIG. 17. Here, the wireless reprogramming execution process by the wireless reprogramming application and the wired reprogramming execution process by the wired reprogramming application will be described. The control unit 5 executes the wireless reprogramming execution process by executing the wireless reprogramming application. The control unit 5 executes the wired reprogramming execution process by executing the wired reprogramming application.

Figure 4:
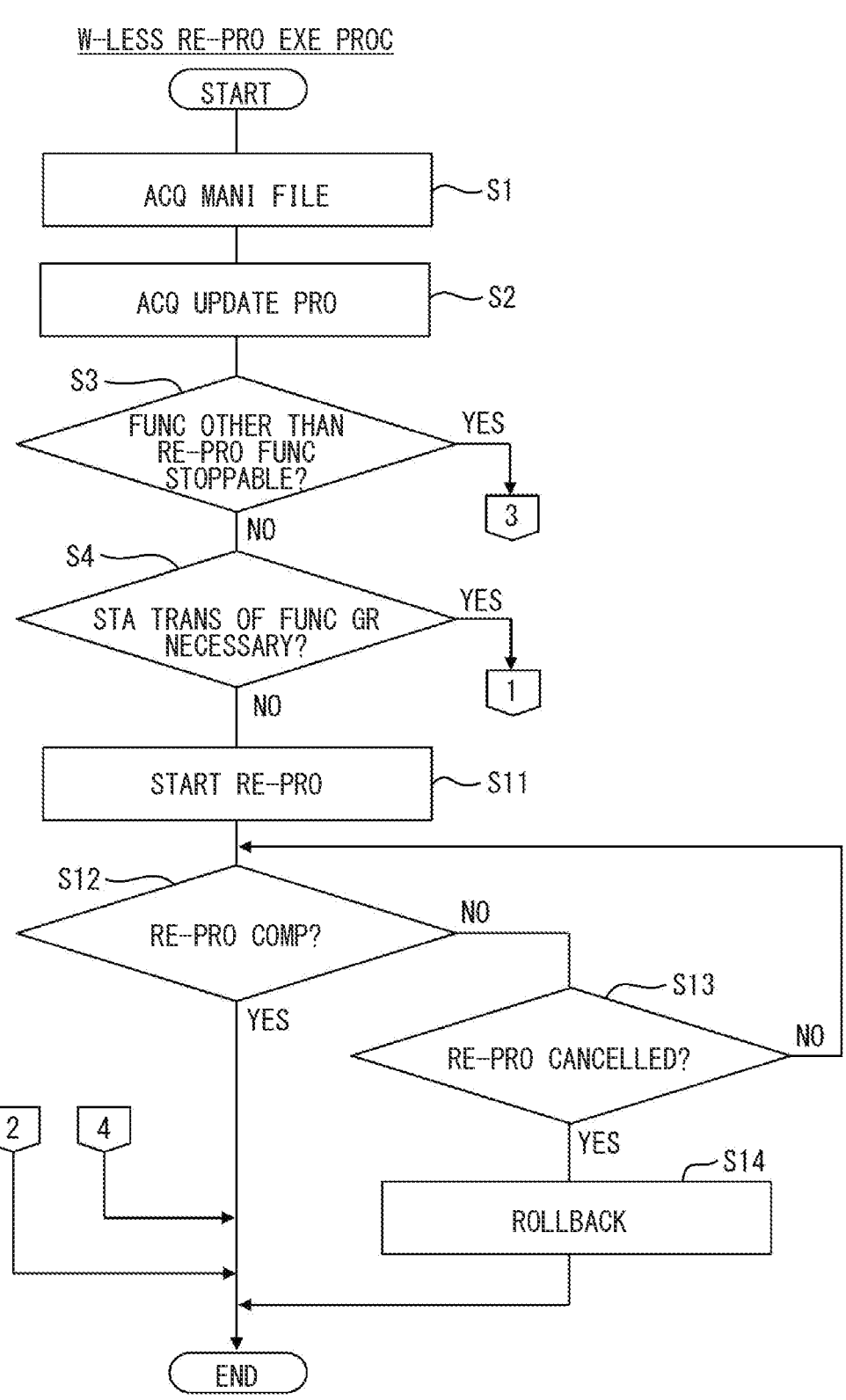
FIG. 4 is a flow chart showing wireless reprogram execution processing.
Figure 5:
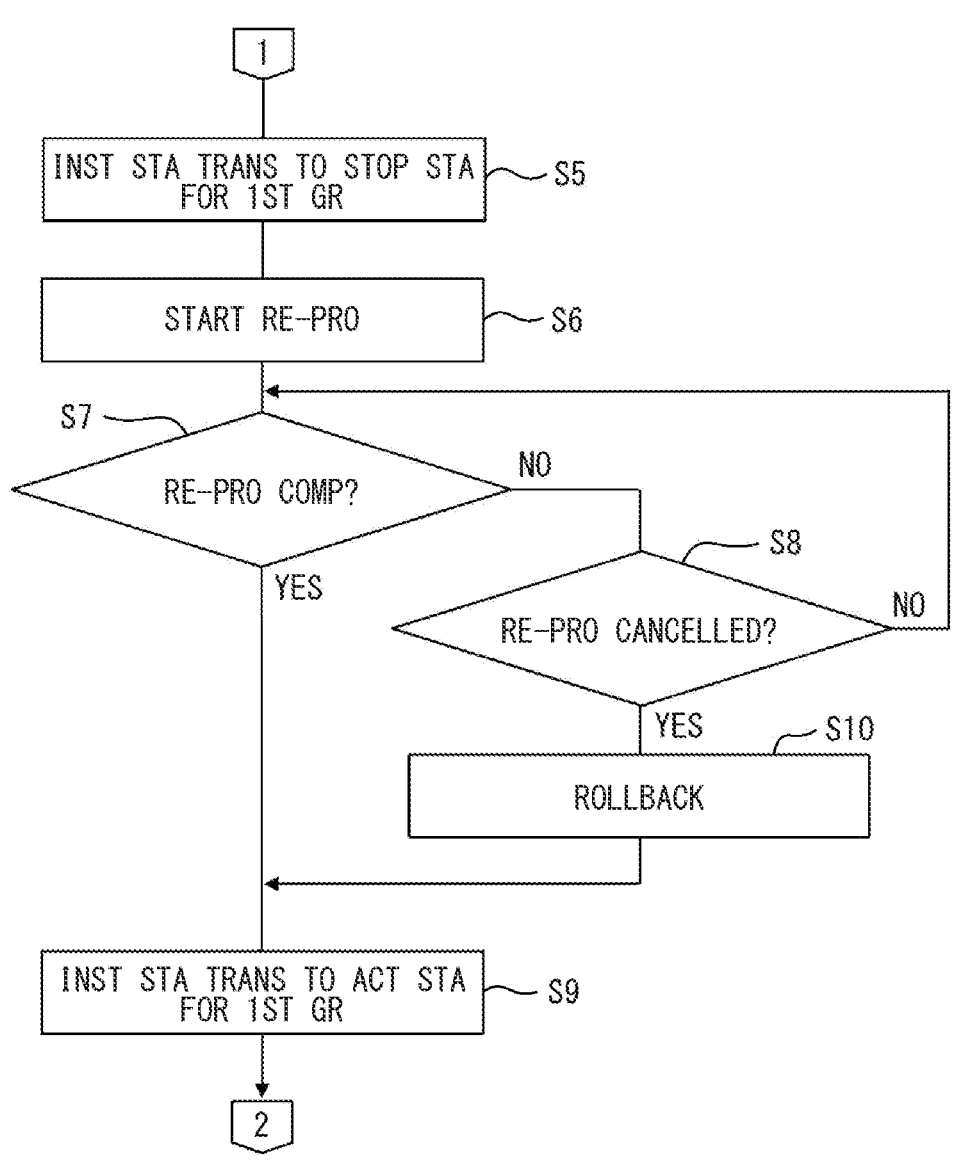
FIG. 5 is a flow chart showing wireless reprogram execution processing.
Figure 6:
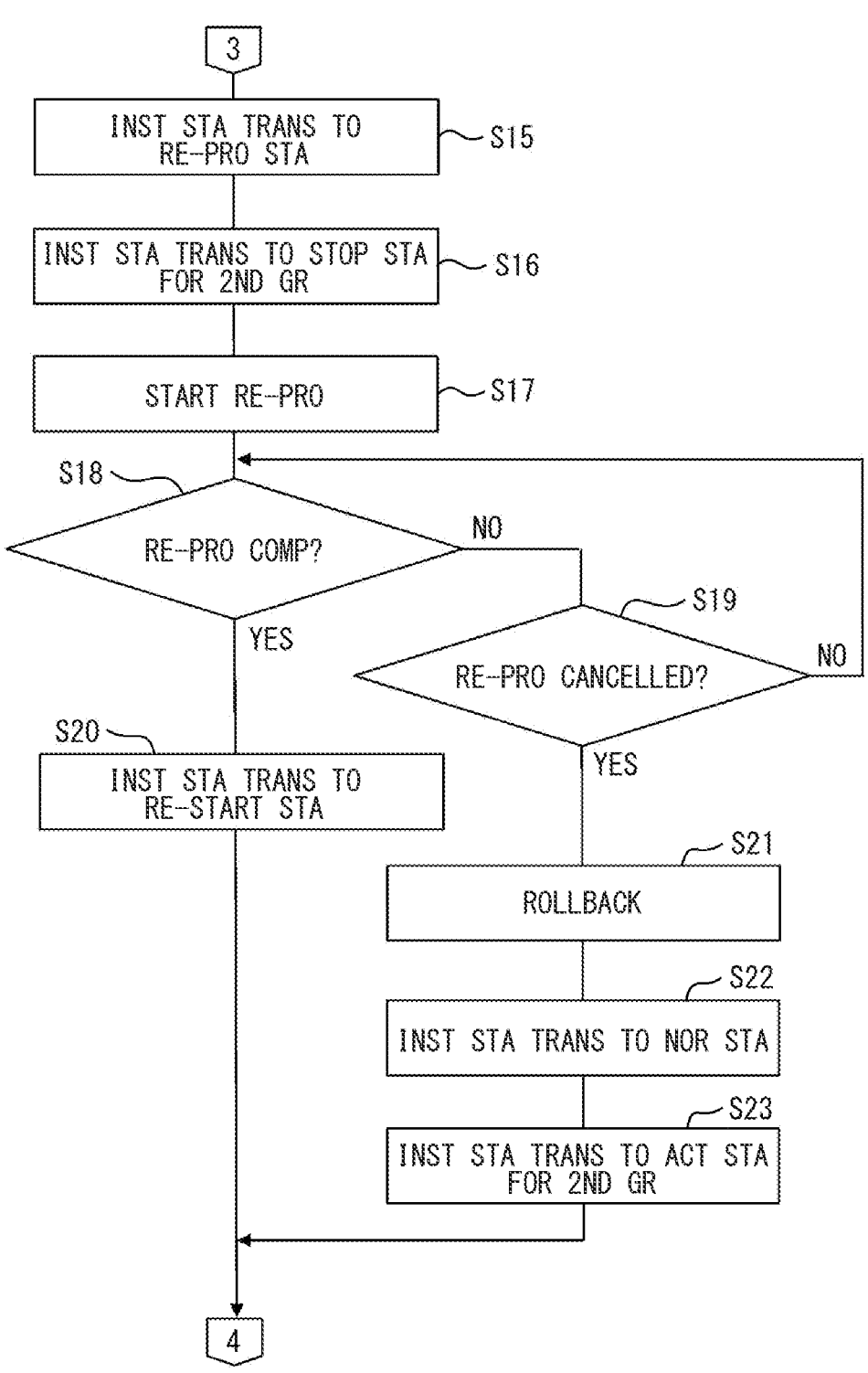
FIG. 6 is a flow chart showing wireless reprogram execution processing.

(1-1) Wireless Reprogramming Execution Process (See FIGS. 4 to 6)

The wireless reprogramming application starts the wireless reprogramming execution process when the condition for starting the wireless reprogramming execution process is satisfied. When the wireless reprogram application starts the wireless reprogram execution process, it acquires the manifest file (at S1, corresponding to the manifest file acquisition procedure) and acquires the update program (at S2, corresponding to the update program acquisition procedure). After that, the wireless reprogram application executes the reprogram execution procedure according to the acquired manifest file.

The wireless reprogram application determines whether functions other than the reprogram function can be stopped (at S3). When, in the wireless reprogram application, it is determined that the functions other than the reprogram function cannot be stopped, i.e., cannot be stoppable due to, for example, the condition that the vehicle drive mechanism is activated or the vehicle speed is equal to or higher than a predetermined value ("NO" at S3), in the application, it is determined whether the switching between the activation screen and the non-activation screen is to be performed after the completion of the reprogramming, and determined whether the state transition of the function group is necessary (at S4). In the wireless reprogram application, it is determined whether the state transition of the function group is necessary based on, for example, a manifest file or campaign notification. Although steps S3 and S4 are shown as conditional branches in the wireless reprogram application, these branches are for the sake of convenience in explaining the operation of the wireless reprogram application. Since it is determined in which state of the use cases 1 to 4 it is to be update, according to the character of the update program, step S3 is a step of confirming the state of the vehicle drive mechanism or the vehicle speed, and step S4 is a step of determining the state transition of the function group.

When, in the wireless reprogram application, it is determined that the switching between the activation screen and the non-activation screen is not to be performed after the reprogramming is completed, that is, when it is determined that the state transition of the function group is necessary ("YES" at S4), it is specified that the present case corresponds to use the case 1 described above. When in the wireless reprogram application, it is determined that the present case corresponds to the use case 1, the state transition to the stop state is instructed to the application belonging to the first group (at S5), and the reprogramming is started (at S6). After starting the reprogram, in the wireless reprogram application, it is determined whether or not the reprogramming has been completed, and also determined whether or not the reprogramming has been canceled without completing the reprogram (at S7 and S8).

Alternatively, in the wireless reprogram application, when it is determined that the switching between the activation screen and the non-activation screen is not to be performed after reprogramming is completed, that is, when it is determined that the state transition of the function group is necessary ("YES" at S4), the state transition to the stop state is instructed to the application belonging to the first group (at S5), and the reprogramming is started (at S6). After starting the reprogram, in the wireless reprogram application, it is determined whether or not the reprogramming has been completed, and also determined whether or not the reprogramming has been canceled without completing the reprogram (at S7 and S8).

When, in the wireless reprogramming application, it is determined that the reprogramming is completed without canceling the reprogramming ("YES" at S7), the state transition to the activation state is instructed to the application belonging to the first group (at S9), and the wireless reprogram execution process ends. When, in the wireless reprogram application, it is determined that the reprogramming has been canceled without completing the reprogram ("YES" at S8), the rollback process to return to the state before the start of the reprogram is performed (at S10), and the state transition to the activation state is instructed to the application belonging to the first group (at S9), and the wireless reprogram process ends.

When, in the wireless reprogram application, it is determined that the switching between the activation screen and the non-activation screen is to be performed after the reprogramming is completed, that is, when it is determined that the state transition of the function group is not necessary ("NO" at S4), it is specified that the present case corresponds to use the case 2 described above. When, in the wireless reprogram application, it is specified that the present case is the use case 2, the reprogramming is started without instructing the state transition to the application belonging to the first group (at S11). After starting the reprogram, in the wireless reprogram application, it is determined whether or not the reprogramming has been completed, and also determined whether or not the reprogramming has been canceled without completing the reprogram (at S12 and S13).

Alternatively, when, in the wireless reprogram application, the switching between the activation screen and the non-activation screen is to be performed after the reprogramming is completed, that is, when it is determined that the state transition of the function group is not necessary ("NO" at S4), the reprogramming is started without instructing the state transition to the application belonging to the first group (at S11). After starting the reprogram, in the wireless reprogram application, it is determined whether or not the reprogramming has been completed, and also determined whether or not the reprogramming has been canceled without completing the reprogram (at S12 and S13).

When, in the wireless reprogramming application, it is determined that the reprogramming has been completed without canceling the reprogramming ("YES" at S12), the wireless reprogramming process ends. When, in the wireless reprogramming application, it is determined that the reprogramming has been canceled without completing the reprogramming ("YES at S13), the rollback to return to the state before the start of the reprogramming (at S14), and the wireless reprogramming process ends.

When, in the wireless reprogram application, it is determined that functions other than the reprogram function can be stopped due to, for example, the feature that the vehicle drive mechanism is being stopped or the vehicle speed is less than a predetermined value ("YES" at S3), it is specified that the present case is the use case 3 described above. When, in the wireless reprogram application, it is specified that the present case is the use case 3, the state transition to the reprogram state is instructed (at S15), the state transition to the stop state is instructed to the application belonging to the second group (at S16), and the reprogramming is started (at S17). After starting the reprogram, in the wireless reprogram application, it is determined whether or not the reprogramming has been completed, and also determined whether or not the reprogramming has been canceled without completing the reprogram (at S18 and S19).

Alternatively, when, in the wireless reprogram application, it is determined that functions other than the reprogram function can be stopped due to, for example, the feature that the vehicle drive mechanism is being stopped or the vehicle speed is less than a predetermined value ("YES" at S3), the state transition to the reprogram state is instructed (at S15), the state transition to the stop state is instructed to an application belonging to the second group (at S16), and the reprogramming is started (at S17). After starting the reprogram, in the wireless reprogram application, it is determined whether or not the reprogramming has been completed, and also determined whether or not the reprogramming has been canceled without completing the reprogram (at S18 and S19).

When, in the wireless reprogramming application, it is determined that the reprogramming has been completed without canceling the reprogram ("YES" at S18), the state transition to the restart state is instructed (at S20), and the wireless reprogramming process ends. When, in the wireless reprogram application, it is determined that the reprogramming has been canceled without completing the reprogram ("YES" at S19, the rollback process to return to the state before the start of the reprogram is performed (at S21), the state transition to the normal state is instructed (at S22), the state transition to the activation state is instructed to the application belonging to the second group (at S23), and the wireless reprogram Process Ends.

Figure 7:
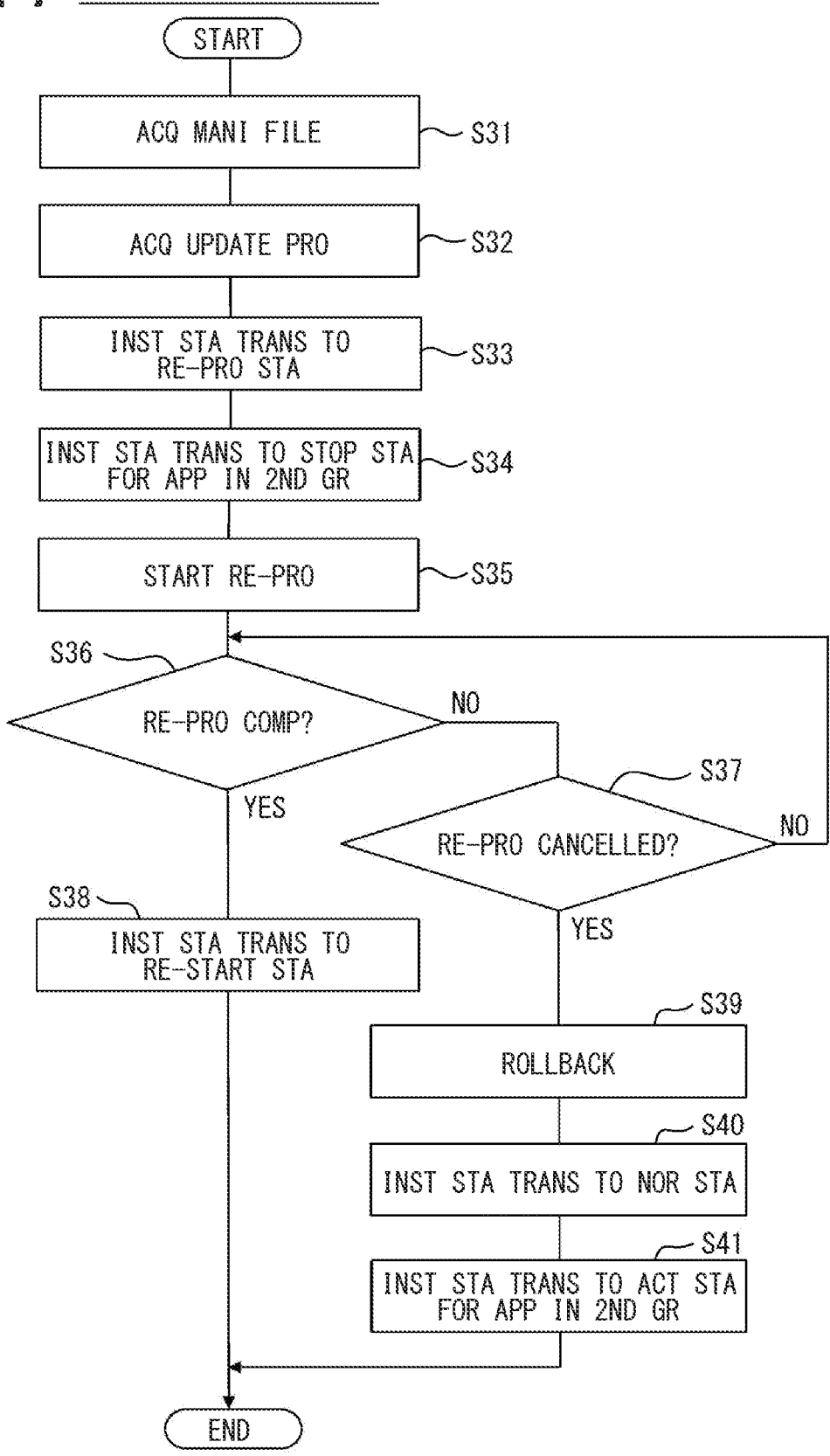
FIG. 7 is a flowchart showing wired reprogram execution processing.

(1-2) Wired Reprogramming Process (See FIG. 7)

The wired reprogramming application starts the wired reprogramming execution process when the condition for starting the wired reprogramming execution process is satisfied. When the wired reprogram application starts the wired reprogram execution process, it acquires the manifest file (at S31, corresponding to the manifest file acquisition procedure) and acquires the update program (at S32, corresponding to the update program acquisition procedure). The wired reprogram application instructs a state transition to the reprogram state (at S33), instructs the state transition to the stop state to an app belonging to the second group (at S34), and the reprogramming is started (at S35). After starting the reprogram, in the wired reprogram application, it is determined whether or not the reprogramming has been completed, and also determined whether or not the reprogramming has been canceled without completing the reprogram (at S36 and S37). When, in the wired reprogramming application, it is determined that the reprogramming has been completed without canceling the reprogram ("YES" at S36), the state transition to the restart state is instructed (at S38), and the wired reprogramming process ends.

When, in the wired reprogram application, it is determined that the reprogramming has been canceled without completing the reprogram ("YES" at S37, the rollback process to return to the state before the start of the reprogram is performed (at S39), the state transition to the normal state is instructed (at S40), the state transition to the activation state is instructed to the application belonging to the second group (at S41), and the wired reprogram process ends.

The flow of processing in each of the above use cases 1 to 4 will be described with reference to FIGS. 8 to 17. Here, a case is illustrated in which an application X and an application Y belong to the first group, and the application Y and an application Z belong to the second group.

Figure 8:
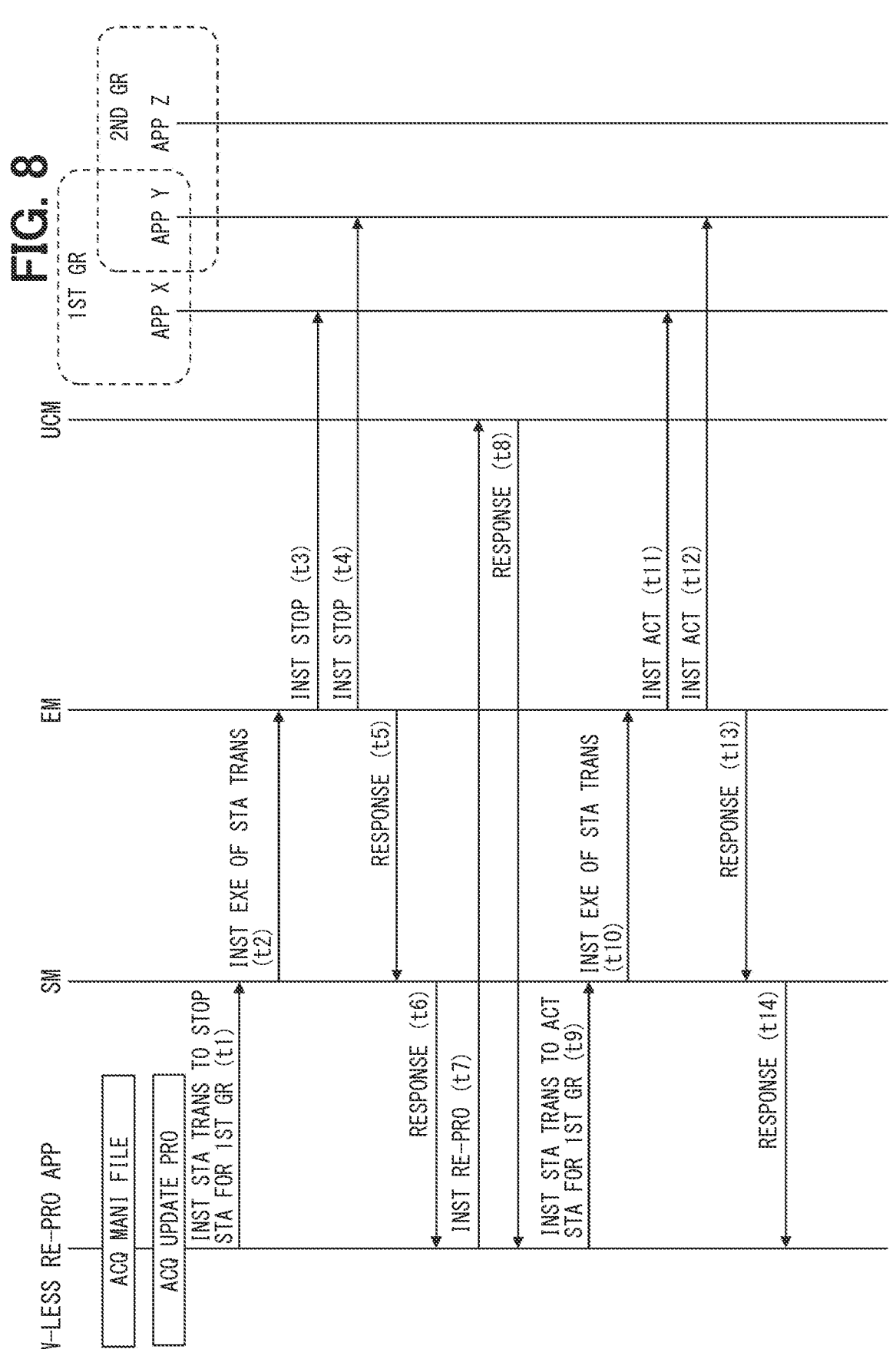
FIG. 8 is a diagram showing the flow of processing for use case 1.
Figure 9:
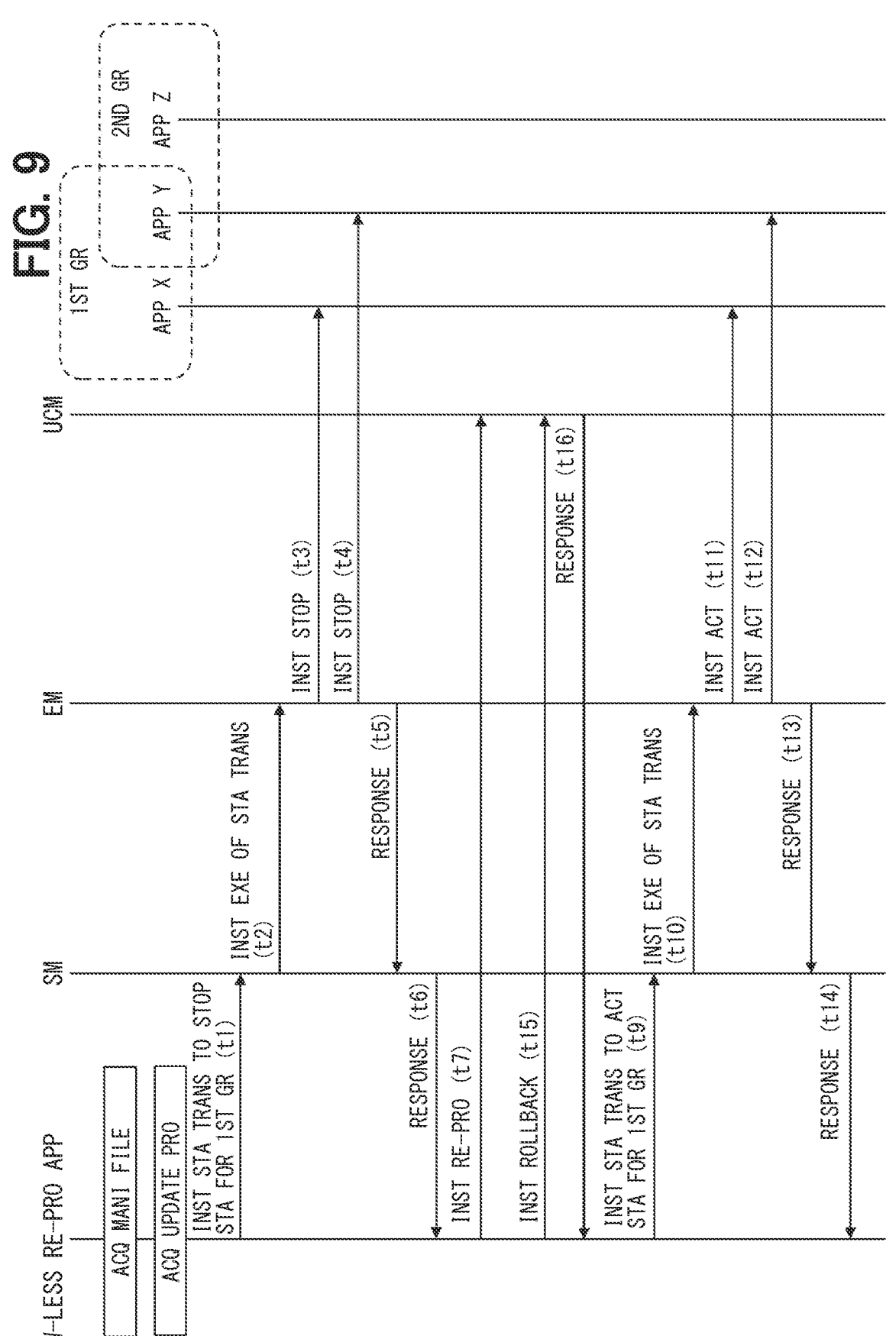
FIG. 9 is a diagram showing the flow of processing for use case 1.

(2-1) Use Case 1 (See FIGS. 8 and 9)

When the wireless reprogram application acquires the manifest file, acquires the update program, determines that it is not possible to stop functions other than the reprogram function, and determines that the state transition of the function group is necessary, the state transition instruction to the stop state for the first group is notified to the SM (at t1). When the SM is notified of the state transition instruction to the stop state for the first group from the wireless reprogram application, the SM notifies the EM of the state transition execution instruction (at t2). When the EM is notified of the state transition instruction from the SM, the EM notifies the application X and the application Y belonging to the first group of a stop instruction (at t3 and t4), and notifies the SM of a response to the state transition execution instruction (at t5). The application X and the application Y are stopped when a stop instruction is notified from the EM. Upon being notified of the response to the state transition execution instruction from the EM, the SM notifies the wireless reprogram application of the response to the state transition instruction (at t6).

When the wireless reprogramming application is notified of the response to the state transition instruction from the SM, it notifies the reprogramming instruction to the UCM (at t7). The UCM starts reprogramming when a reprogram instruction is notified from the wireless reprogram application. When the reprogramming is completed, the UCM notifies the wireless reprogramming application of a response to the reprogramming instruction (at t8).

When the wireless reprogramming application is notified of the response to the reprogramming instruction from the UCM, it notifies the SM of a state transition instruction to the activation state for the first group (at t9). When the SM is notified of the state transition instruction to the activation state for the first group from the wireless reprogram application, the SM notifies the EM of the state transition execution instruction (at t10). When the EM is notified of the state transition instruction from the SM, the EM notifies the application X and the application Y belonging to the first group of the activation instruction (at t11 and t12), and notifies the SM of a response to the state transition execution instruction (at t13). The application X and the application Y are activated when an activation instruction is notified from the EM. Upon being notified of the response to the state transition execution instruction from the EM, the SM notifies the wireless reprogram application of the response to the state transition instruction (at t14).

On the other hand, when the wireless reprogramming application notifies the UCM of the reprogramming instruction (at t7), and the reprogramming is canceled without completing the reprogramming, it notifies the UCM of a rollback instruction to return to the state before the start of the reprogramming (at t15). The UCM starts the rollback when a rollback instruction is notified from the wireless reprogram application. After completing the rollback, the UCM notifies the wireless reprogram application of a response to the rollback instruction (at t16). When the wireless reprogram application is notified of the response to the rollback instruction from the UCM, it notifies the SM of the state transition instruction to the activation state for the first group (at t9), and performs the steps after t9 described above.

Figure 10:
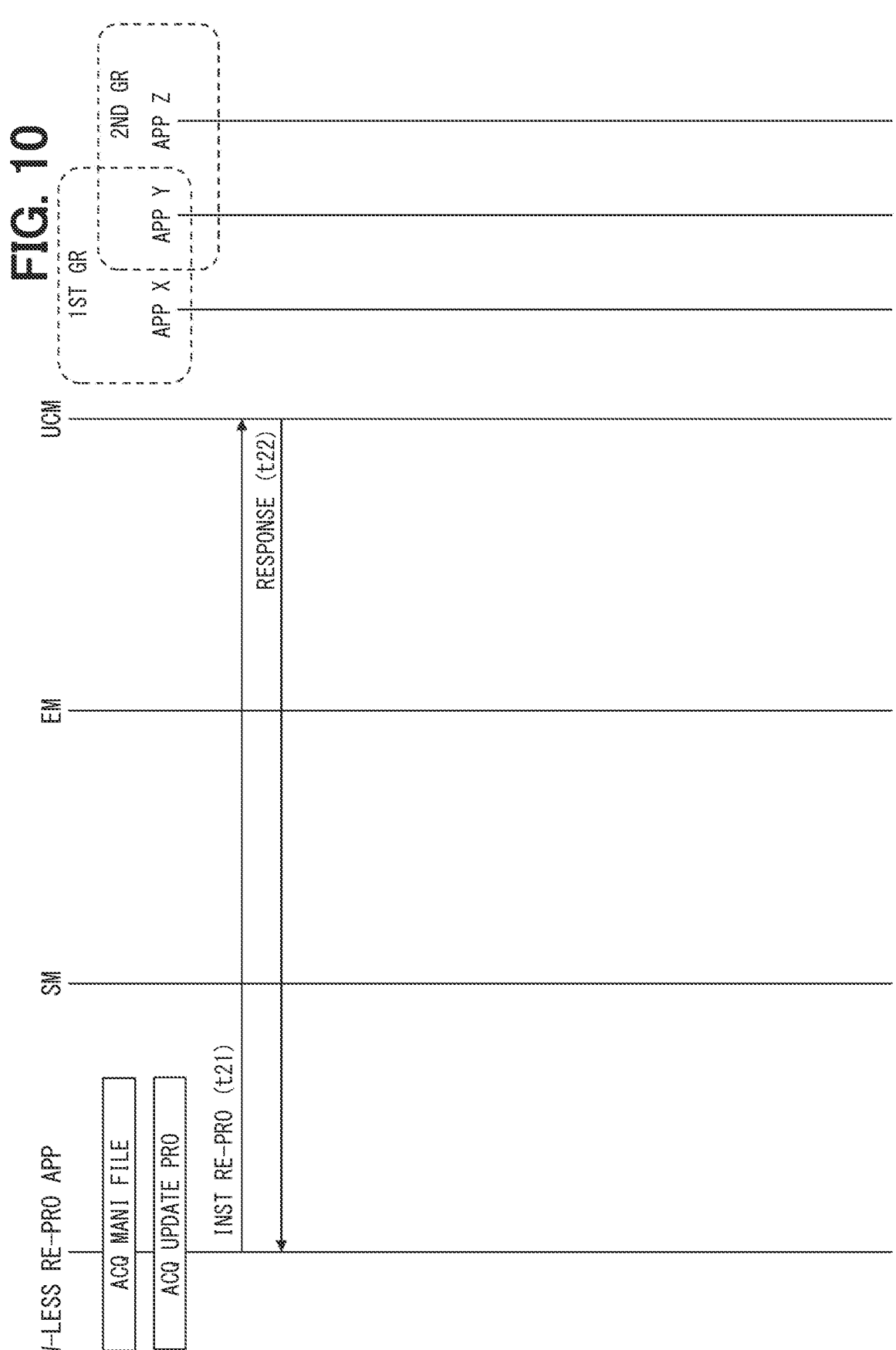
FIG. 10 is a diagram showing the flow of processing for use case 2.
Figure 11:
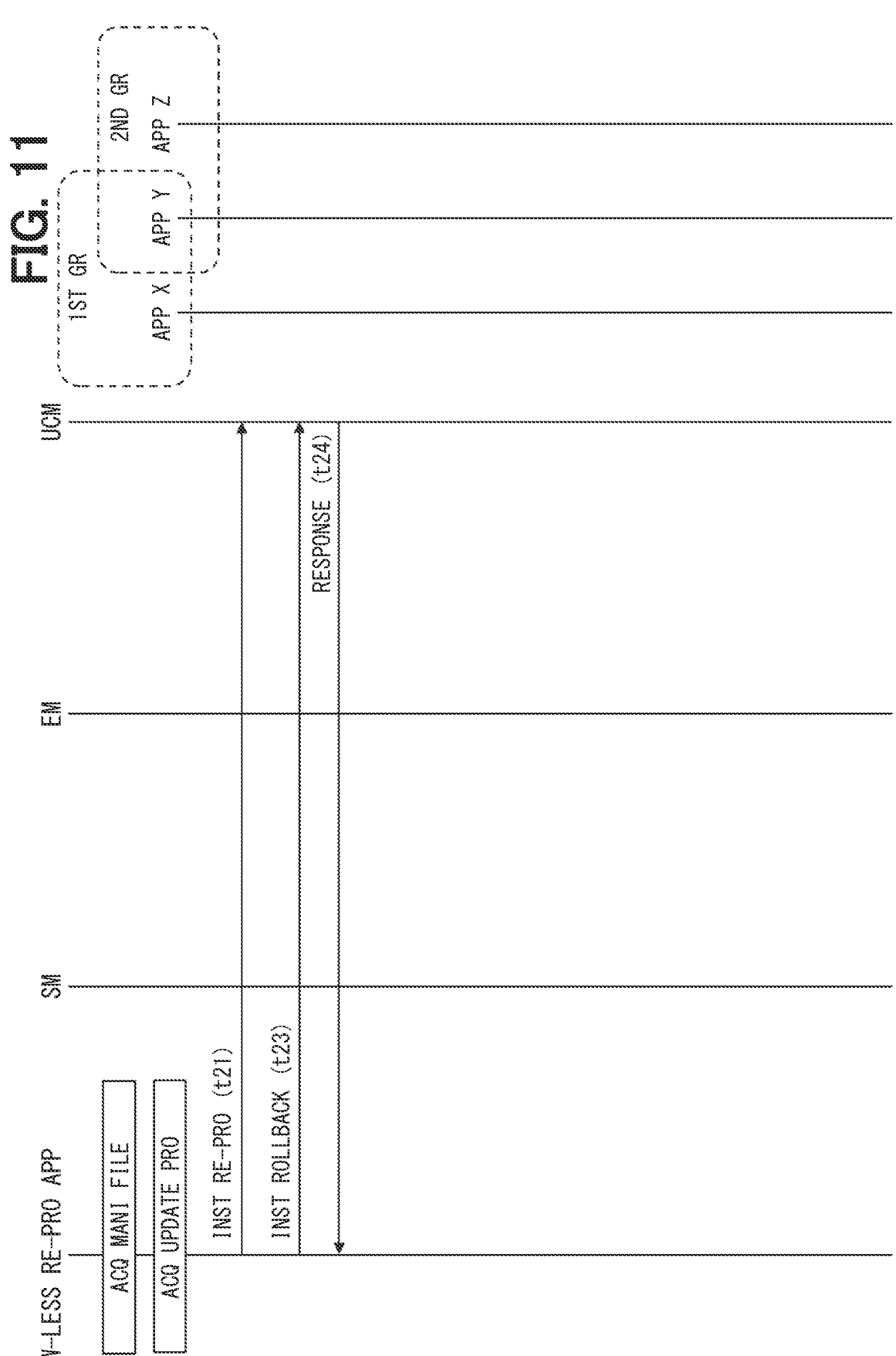
FIG. 11 is a diagram showing the flow of processing for use case 2.

(2-2) Use Case 2 (See FIGS. 10 and 11)

When the wireless reprogram application acquires the manifest file, acquires the update program, determines that it is not possible to stop functions other than the reprogram function, and determines that the state transition of the function group is not necessary, the reprogram instruction is instructed to the UCM (at t21). The UCM starts reprogramming when a reprogram instruction is notified from the wireless reprogram application. When the reprogramming is completed, the UCM notifies the wireless reprogramming application of a response to the reprogramming instruction (at t22).

On the other hand, when the wireless reprogramming application notifies the UCM of the reprogramming instruction (at t21), and the reprogramming is canceled without completing the reprogramming, it notifies the UCM of a rollback instruction to return to the state before the start of the reprogramming (at t23). The UCM starts the rollback when a rollback instruction is notified from the wireless reprogram application. After completing the rollback, the UCM notifies the wireless reprogram application of a response to the rollback instruction (at t24).

Figure 12:
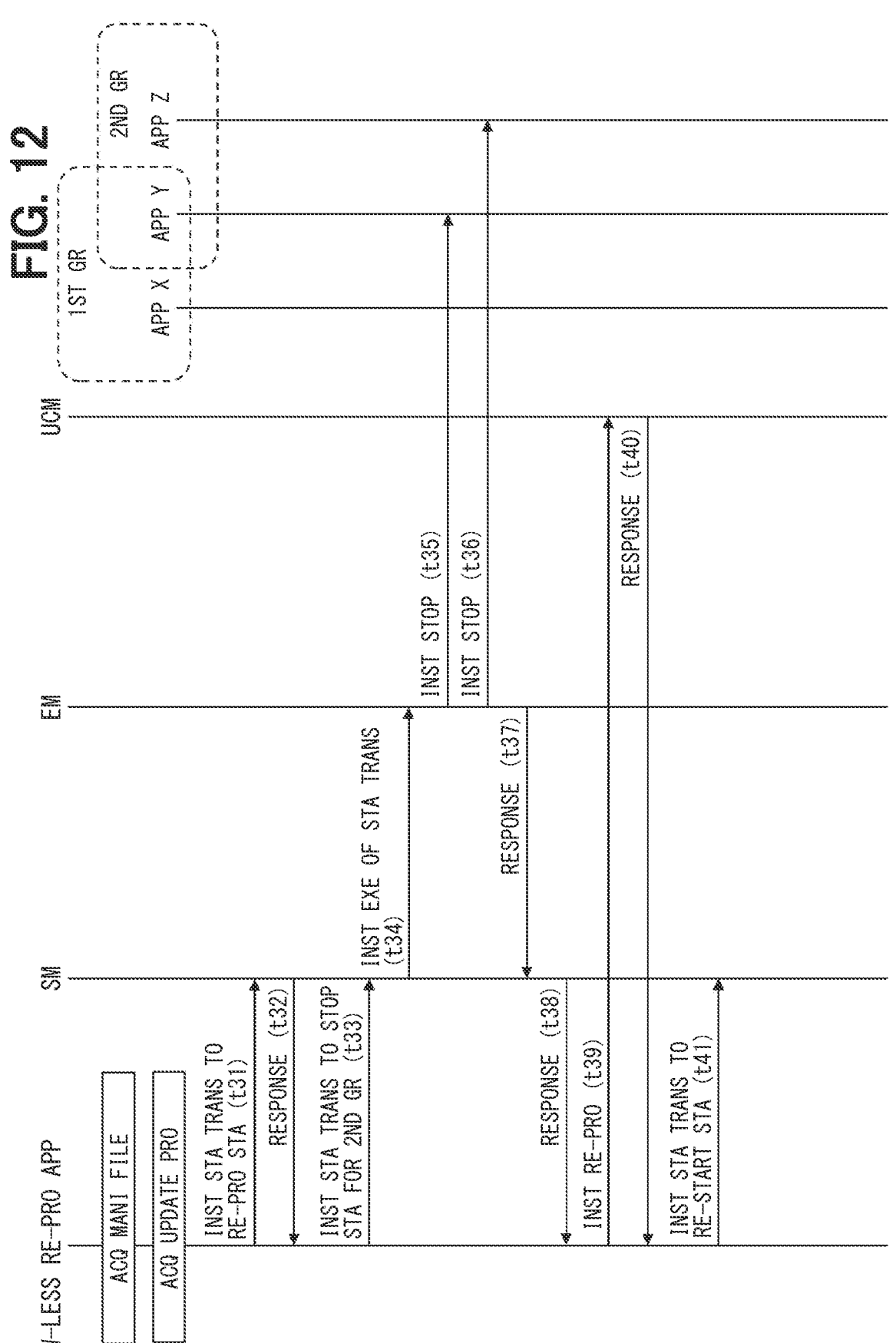
FIG. 12 is a diagram showing the flow of processing for use case 3.
Figure 13:
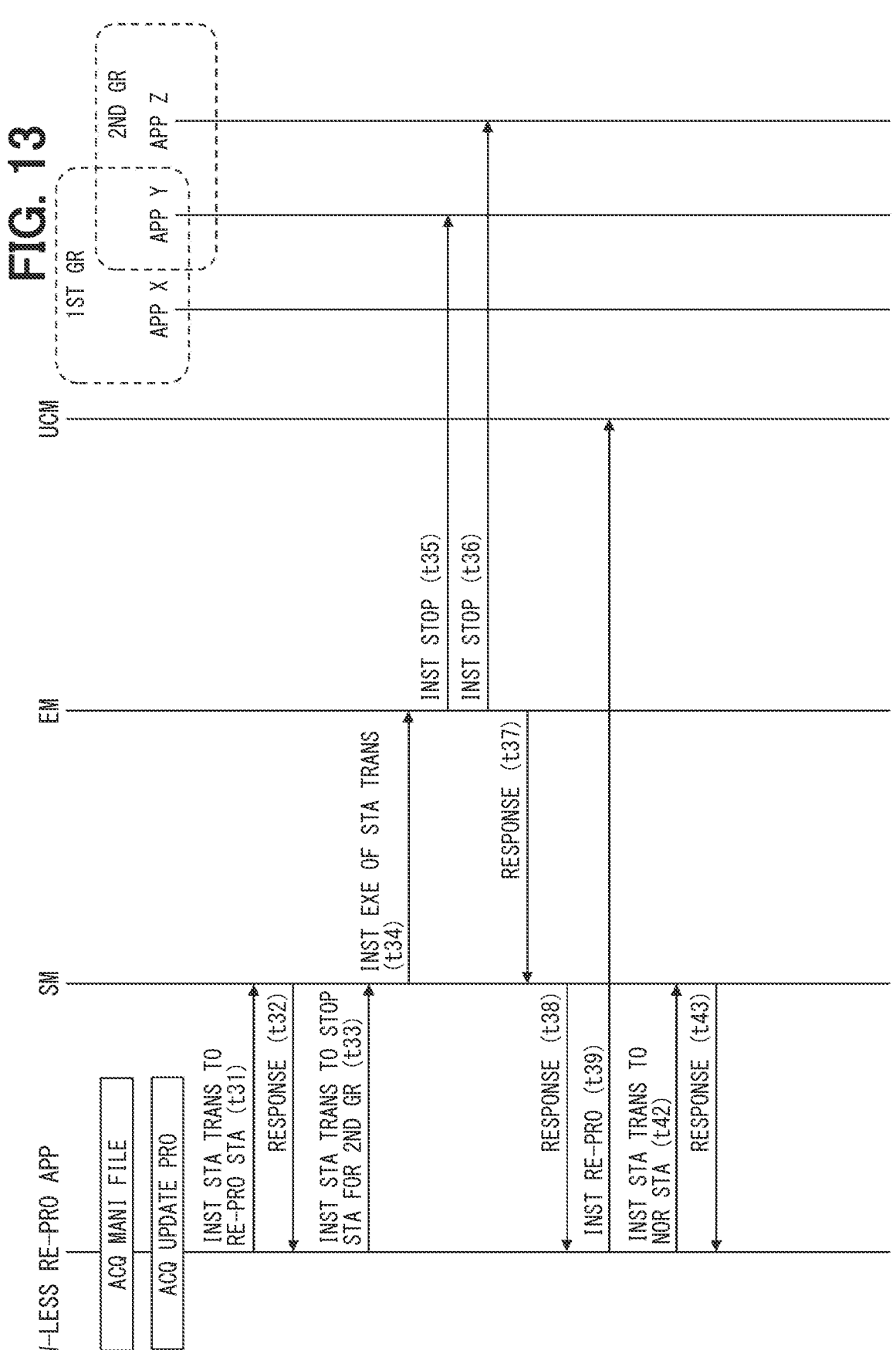
FIG. 13 is a diagram showing the flow of processing for use case 3.
Figure 14:
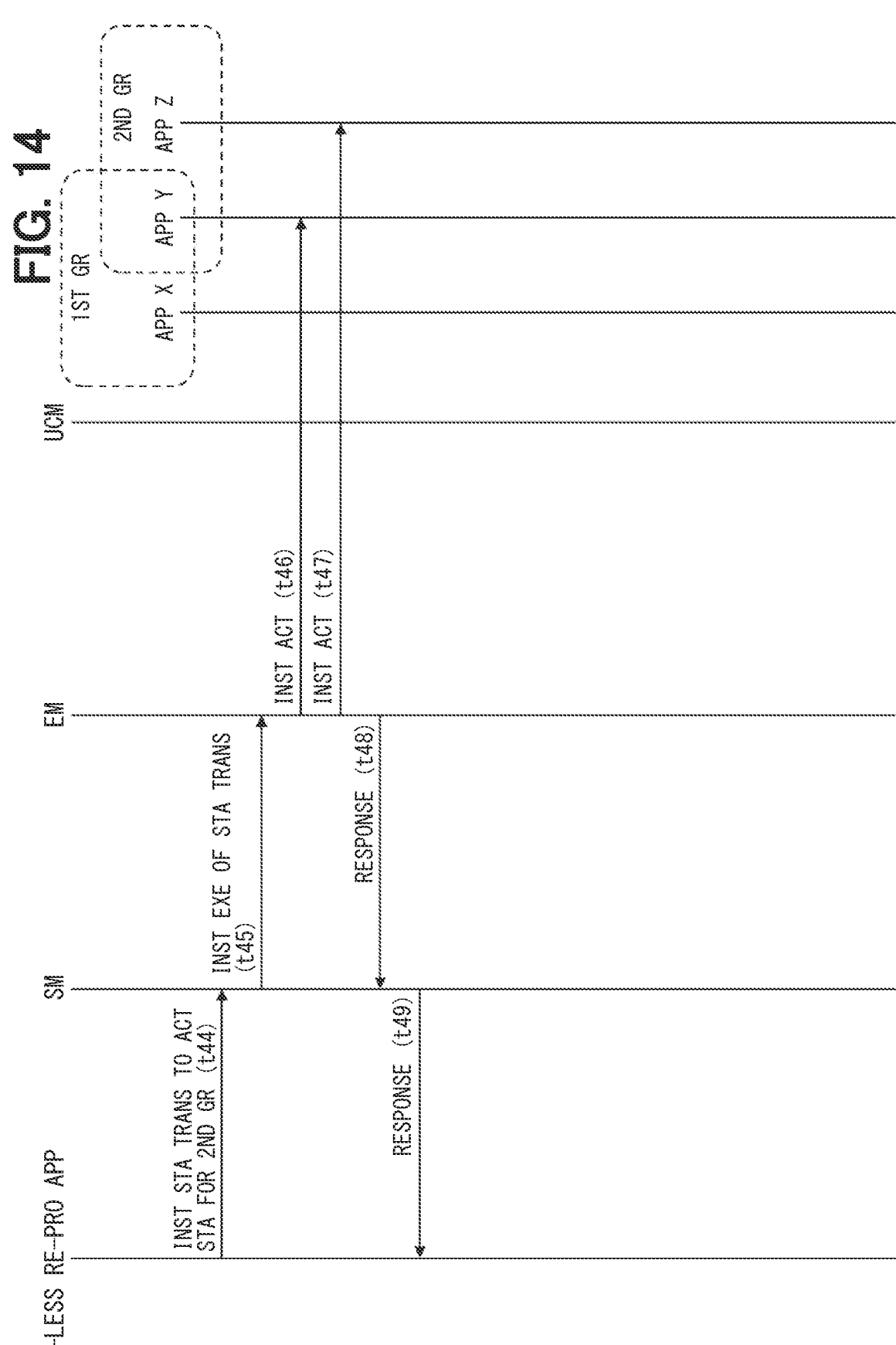
FIG. 14 is a diagram showing the flow of processing for use case 3.

(2-3) Use Case 3 (See FIGS. 12 to 14)

When the wireless reprogram application acquires the manifest file, acquires the update program, and determines that functions other than the reprogram function can be stopped, it notifies the SM of a state transition instruction to the reprogram state (at t31). When the state transition instruction to the reprogram state is notified from the wireless reprogram application, the SM performs the state transition to the reprogram state and notifies the wireless reprogram application of a response to the state transition instruction (at t32).

When notifying the response to the state transition instruction from the SM, the wireless reprogram application notifies the SM of the state transition instruction to the stop state for the second group (at t33). When the SM is notified of the state transition instruction to the stop state for the second group from the wireless reprogram application, the SM notifies the EM of the state transition execution instruction (at t34). When the EM is notified of the state transition instruction from the SM, the EM notifies the application Y and the application Z belonging to the second group of a stop instruction (at t35 and t36), and notifies the SM of a response to the state transition execution instruction (at t37). The application Y and the application Z are stopped when a stop instruction is notified from the EM. Upon being notified of the response to the state transition execution instruction from the EM, the SM notifies the wireless reprogram application of the response to the state transition instruction (at t38).

When the wireless reprogramming application is notified of the response to the state transition instruction from the SM, it notifies the reprogramming instruction to the UCM (at t39). The UCM starts reprogramming when a reprogram instruction is notified from the wireless reprogram application. When the reprogramming is completed, the UCM notifies the wireless reprogramming application of a response to the reprogramming instruction (at t40).

When the wireless reprogramming application is notified of the response to the reprogramming instruction from the UCM, it notifies the SM of a state transition instruction to the restart state (at t41). The SM performs a restart when a state transition instruction to the restart state is notified from the wireless reprogram application.

On the other hand, when the wireless reprogramming application notifies the reprogramming instruction to the UCM (at t39), and the reprogramming is canceled without completing the reprogramming, it notifies the SM of a state transition instruction to the normal state (at t42). When the state transition instruction to the normal state is notified from the wireless reprogram application, the SM performs the state transition to the normal state, and notifies the wireless reprogram application of a response to the state transition instruction (at t43).

When notifying the response to the state transition instruction from the SM, the wireless reprogram application notifies the SM of the state transition instruction to the activation state for the second group (at t44). When the SM is notified of the state transition instruction to the activation state for the second group from the wireless reprogram application, the SM notifies the EM of the state transition execution instruction (at t45). When the EM is notified of the state transition instruction from the SM, the EM notifies the application Y and the application Z belonging to the second group of an activation instruction (at t46 and t47), and notifies the SM of a response to the state transition execution instruction (at t48). The application Y and the application Z are activated when an activation instruction is notified from the EM. Upon being notified of the response to the state transition execution instruction from the EM, the SM notifies the wireless reprogram application of the response to the state transition instruction (at t49).

Figure 15:
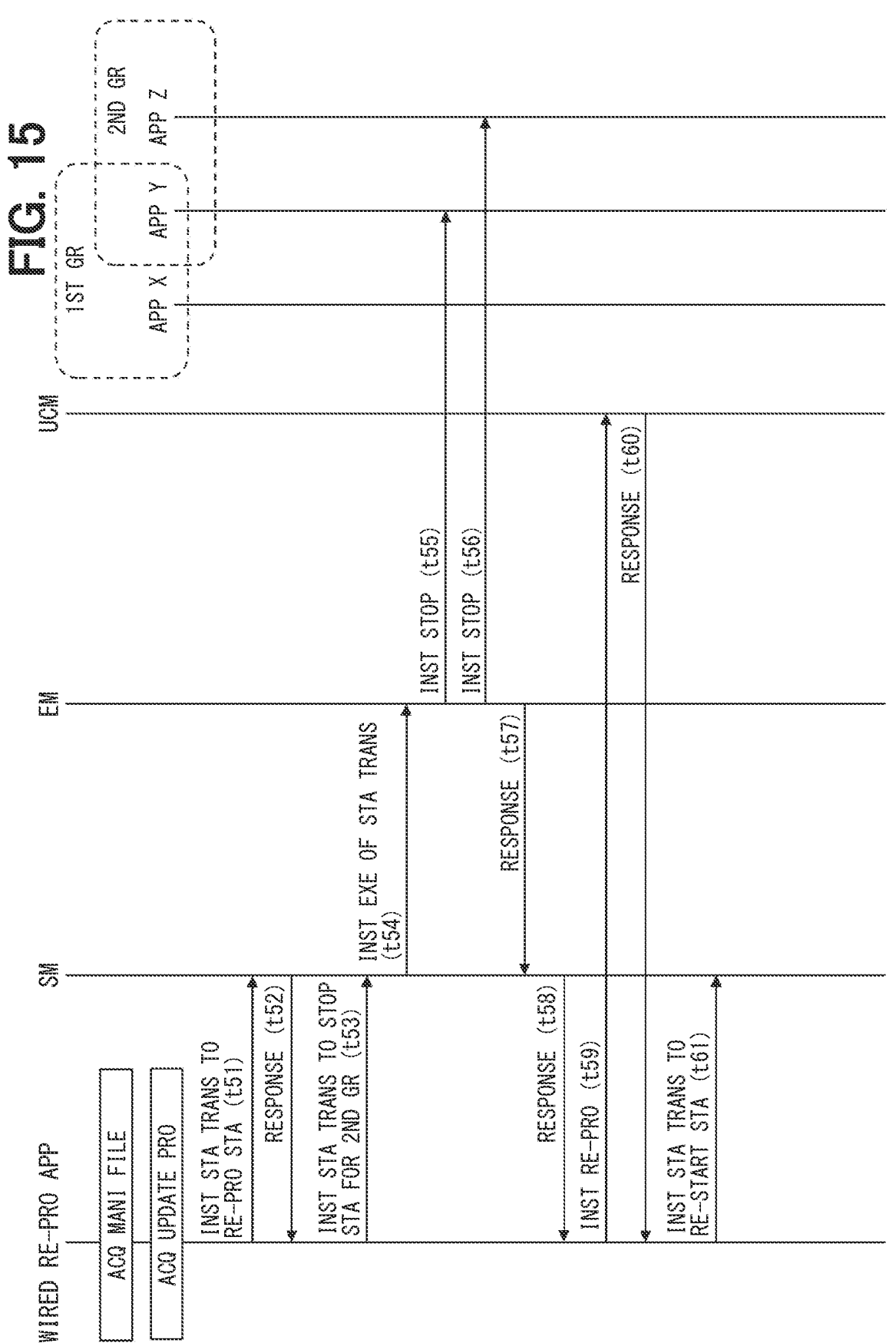
FIG. 15 is a diagram showing the flow of processing for use case 4.
Figure 16:
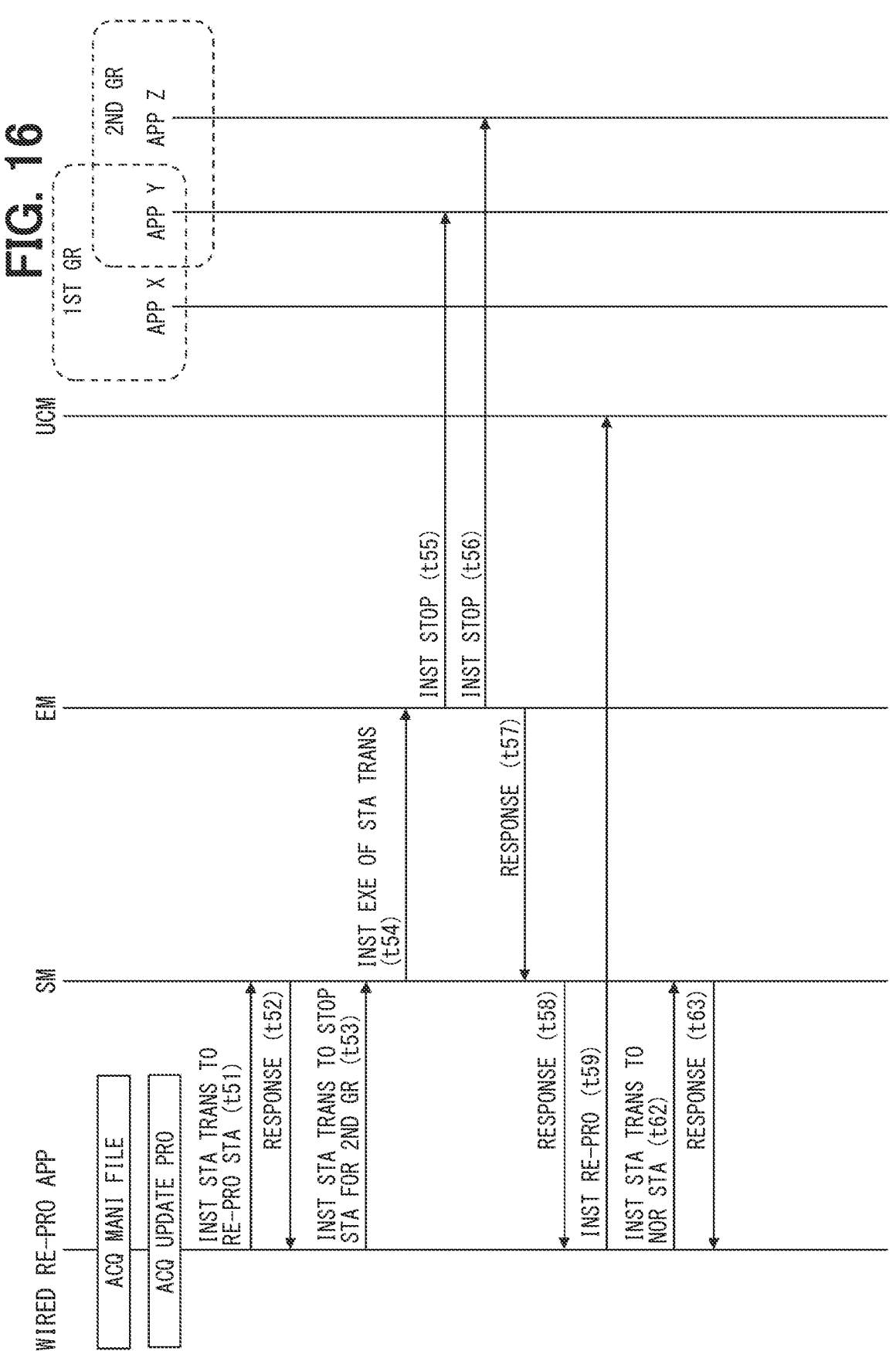
FIG. 16 is a diagram showing the flow of processing for use case 4.
Figure 17:
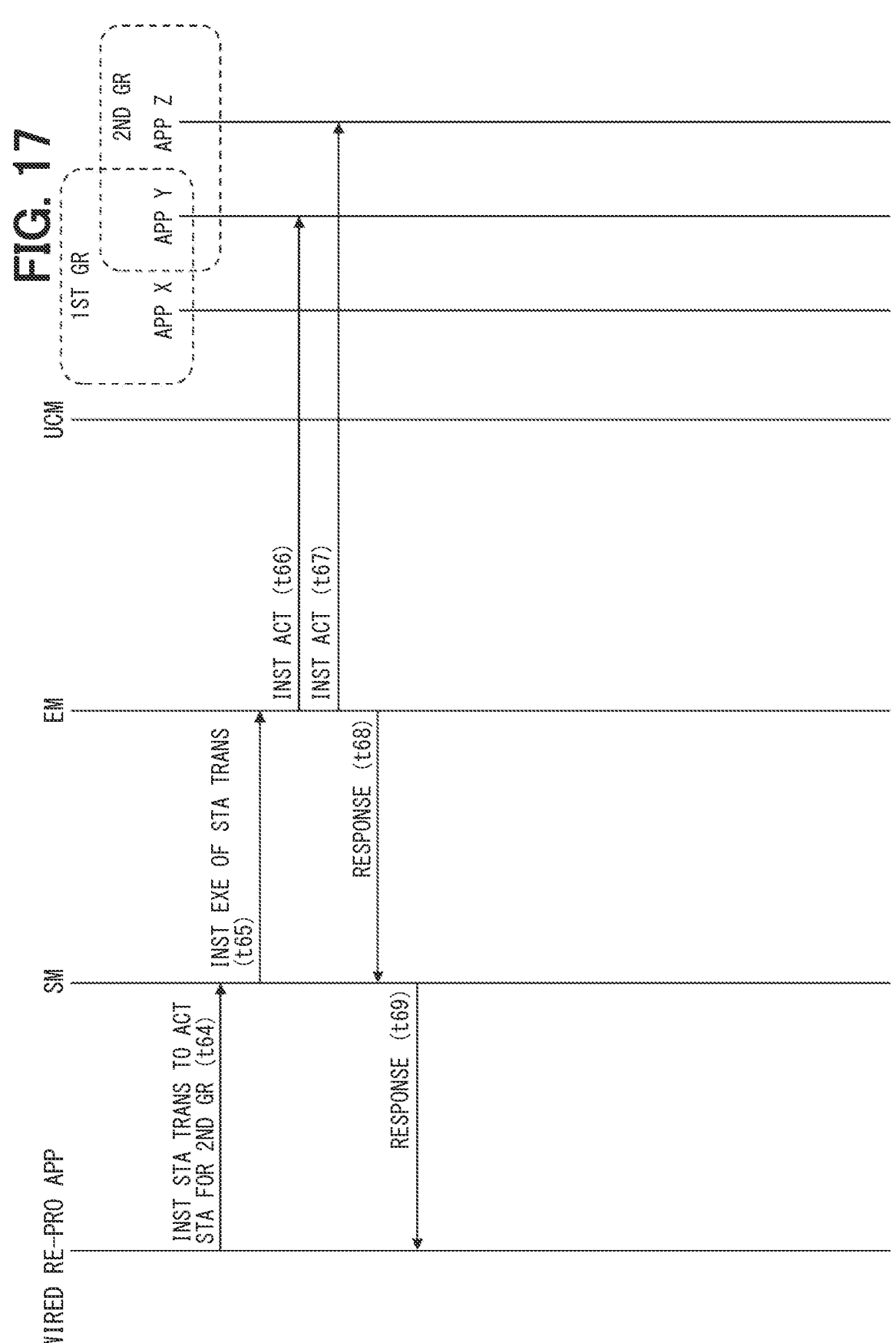
FIG. 17 is a diagram showing the flow of processing for use case 4.

(2-4) Use Case 4 (See FIGS. 15 to 17)

The wired reprogram application performs the same processing as the wireless reprogram application in the use case 3 described above. That is, the wired reprogram application performs t51 to t69 similar to t31 to t49.

As described above, according to the present embodiment, the following actions and effects can be achieved.

In the master ECU 1, the state transition to the normal state or the reprogram state defined as the machine state in the manifest file is instructed, and the state transition to the activation state or stop state is instructed individually to each of the first group and the second group defined as the function groups in the manifest file. By instructing the state transition to the normal state or the reprogram state and instructing the state transition to the activation state or the stopped state for each of the first group and the second group, the reprogramming can be performed appropriately. As a result, the reprogramming can be performed appropriately without restarting the reprogram target ECU 3.

In the master ECU 1, when the wireless reprogramming is performed while the vehicle drive mechanism is running, and applications are to be installed, updated, and uninstalled, the state transition to the stop state is instructed to an application belonging to the first group to start the reprogramming, and the state transition to the activation state is instructed to the application belonging to the first group after the reprogram is completed. The wireless reprogramming is performed while the vehicle drive mechanism is running, and the reprogramming can be appropriately performed in situations where applications are installed, updated, and uninstalled.

In the master ECU 1, when the wireless reprogramming is performed while the vehicle driving mechanism is running and the firmware is updated, the reprogramming is started without instructing the state transition to the application belonging to the first group. The wireless reprogramming can be performed while the vehicle drive mechanism is running, and the reprogramming can be appropriately performed in a situation where the firmware is updated.

In the master ECU 1, when the wireless reprogramming is performed while the vehicle drive mechanism is stopped and the firmware is updated, the state transition to the reprogram state is instructed, and the state transition to the stop state is instructed to the application belonging to the second group to start the reprogramming, and the state transition to the restart state after completing reprogram is instructed. The wireless reprogramming can be performed while the vehicle drive mechanism is stopped, and the reprogramming can be appropriately performed in a situation where the firmware is updated.

In the master ECU 1, when the wired reprogramming is performed while the vehicle drive mechanism is stopped and the firmware is updated, the state transition to the reprogram state is instructed, and the state transition to the stop state is instructed to the application belonging to the second group to start the reprogramming, and the state transition to the restart state after completing reprogram is instructed. The wired reprogramming can be performed while the vehicle drive mechanism is stopped, and the reprogramming can be appropriately performed in a situation where the firmware is updated.

While the present disclosure has been described based on the embodiment, the present disclosure is not limited to the embodiment or structure described herein. The present disclosure includes various modification examples or variations within the scope of equivalents. Additionally, various combinations and configurations, as well as other combinations and configurations including more, less, or only a single element, are within the scope and spirit of the present disclosure.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitional tangible recording medium as an instruction to be executed by the computer.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

What is claimed is:

1. An electronic control device comprising:
at least one of (i) a circuit and (ii) a processor with a memory storing computer program code executable by the processor, the at least one of the circuit and the processor configured to cause the electronic control device to implement:
a manifest file acquisition unit that acquires a manifest file defined by Adaptive platform of Automotive Open System Architecture (AUTOSAR Adaptive platform);
an update program acquisition unit that acquires an update program for an electronic control unit that conforms to the AUTOSAR Adaptive Platform; and
a reprogram execution unit that executes reprogramming by instructing the electronic control unit as a reprogram target device to write the update program;
wherein:
the manifest file defines, for each electronic control unit or virtual machine subject to reprogramming, a plurality of machine states including at least a startup state, a shutdown state, a restart state, a normal state, and a reprogram state, as well as a plurality of function groups, each function group including one or more applications;
a first function group of the plurality of function groups includes at least one application that is permitted to be reprogrammed while a vehicle drive mechanism is running;
a second function group of the plurality of function groups includes at least one application that is not related to the reprogramming;
each of the first function group and the second function group has an activation state and a stop state;
the reprogram execution unit executes the reprogramming according to a machine state;
in the reprogram state, which is defined by the manifest file, only an application relating to the reprogramming is operated and an application relating to vehicle driving or navigation is not operated;
the reprogram execution unit is configured to acquire the update program from an update program distribution source via wireless communication or wired communication;
when the update program is acquired via the wireless communication, the reprogram execution unit is configured to: determine, based on the vehicle drive mechanism and a vehicle speed, whether a function other than a reprogram function can be stopped; determine that the function other than the reprogram function can be stopped upon determining that the vehicle drive mechanism is stopped or the vehicle speed is below a predetermined value; instruct a state transition to the reprogram state and a state transition to the stop state for the application belonging to the second function group in accordance with the manifest file upon determining that the function other than the reprogram function can be stopped; and start the reprogramming; and
when the update program is acquired via the wired communication, the reprogram execution unit is configured to: instruct, without determining a state of the vehicle drive mechanism and the vehicle speed, a state transition to the reprogram state and a state transition to the stop state for the application belonging to the second function group in accordance with the manifest file; and start the reprogramming.

2. The electronic control device according to claim 1, wherein:
when the reprogram execution unit acquires the update program from an update program distribution source by wireless communication, a function other than a reprogram function cannot be stopped, and a state transition of the function group is necessary, the reprogram execution unit instructs the state transition to the stop state to the application belonging to the first function group.

3. The electronic control device according to claim 1, wherein:
the reprogram execution unit instructs a state transition to the activation state to the application belonging to the first function group after completing the reprogramming.

4. The electronic control device according to claim 1, wherein:
when the reprogram execution unit acquires the update program from an update program distribution source by wireless communication, a function other than a reprogram function cannot be stopped, and a state transition of the function group is not necessary, the reprogram execution unit starts the reprogramming without instructing the state transition to the application belonging to the first function group.

5. The electronic control device according to claim 1, wherein:
in the manifest file, a restart state is further defined in addition to the normal state and the reprogram state as the machine states, and
the reprogram execution unit instructs the state transition to the restart state after completing the reprogramming.

6. The electronic control device according to claim 1, wherein:
when the reprogramming is canceled without completing the reprogramming, the reprogram execution unit instructs the state transition to the normal state and instructs the state transition to the activation state to the application belonging to the second function group.

7. The electronic control device according to claim 1 wherein:
the processor is configured to implement the manifest file acquisition unit, the update program acquisition unit, and the reprogram execution unit.

8. A reprogram execution method in an electronic control device that executes reprogramming by instructing an electronic control unit as a reprogram target to write an update program, the reprogram execution method comprising:
acquiring a manifest file defined by Adaptive platform of Automotive Open System Architecture (AUTOSAR Adaptive platform);
acquiring an update program for an electronic control unit that conforms to the AUTOSAR Adaptive Platform; and executing the reprogramming according to a machine state;

wherein:

the manifest file defines, for each electronic control unit or virtual machine subject to reprogramming, a plurality of machine states including at least a startup state, a shutdown state, a restart state, a normal state, and a reprogram state, as well as a plurality of function groups, each function group including one or more applications;

a first function group of the plurality of function groups includes at least one to application that is permitted to be reprogrammed while a vehicle drive mechanism is running;

a second function group of the plurality of function groups includes at least one application that is not related to the reprogramming;

each of the first function group and the second function group has an activation state and a stop state;

in the reprogram state, which is defined by the manifest file, only an application relating to the reprogramming is operated and an application relating to vehicle driving or navigation is not operated;

the reprogram execution method further comprising:

acquiring the update program from an update program distribution source via wireless communication or wired communication;

when the update program is acquired via the wireless communication: determining, based on the vehicle drive mechanism and vehicle speed, whether a function other than a reprogram function can be stopped; determining that the function other than the reprogram function can be stopped upon determining that the vehicle drive mechanism is stopped or the vehicle speed is below a predetermined value; instructing a state transition to the reprogram state and a state transition to the stop state for the application belonging to the second function group in accordance with the manifest file upon determining that the function other than the reprogram function can be stopped; and starting the reprogramming; and when the update program is acquired via the wired communication: instructing, without determining a state of the vehicle drive mechanism and the vehicle speed, a state transition to the reprogram state, and a state transition to the stop state for the application belonging to the second function group in accordance with the manifest file; and starting the reprogramming.

9. A non-transitory tangible computer readable storage medium comprising instructions being executed by a control unit of an electronic control device that executes reprogramming by instructing an electronic control unit as a reprogram target to write an update program, the instructions including:

acquiring a manifest file defined by Adaptive platform of Automotive Open System Architecture (AUTOSAR Adaptive platform);

acquiring an update program for an electronic control unit that conforms to the AUTOSAR Adaptive Platform; and executing the reprogramming according to a machine state;

the manifest file defines, for each electronic control unit or virtual machine subject to reprogramming, a plurality of machine states including at least a startup state, a shutdown state, a restart state, a normal state, and a reprogram state, as well as a plurality of function groups, each function group including one or more applications;

wherein:

a first function group of the plurality of function groups includes at least one an application that is permitted to be reprogrammed while a vehicle drive mechanism is running;

a second function group of the plurality of function groups includes at least one application that is not related to the reprogramming;

each of the first function group and the second function group has an activation state and a stop state;

in the reprogram state, which is defined by the manifest file, only an application relating to the reprogramming is operated and an application relating to vehicle driving or navigation is not operated;

the instructions further comprising:

acquiring the update program from an update program distribution source via wireless communication or wired communication;

when the update program is acquired via the wireless communication: determining, based on the vehicle drive mechanism and vehicle speed, whether a function other than a reprogram function can be stopped; determining that the function other than the reprogram function can be stopped upon determining that the vehicle drive mechanism is stopped or the vehicle speed is below a predetermined value; instructing a state transition to the reprogram state and a state transition to the stop state for the application belonging to the second function group in accordance with the manifest file upon determining that the function other than the reprogram function can be stopped; and starting the reprogramming; and when the update program is acquired via the wired communication: instructing, without determining a state of the vehicle drive mechanism and the vehicle speed, a state transition to the reprogram state, and a state transition to the stop state for the application belonging to the second function group in accordance with the manifest file; and starting the reprogramming.

* * * * *